March 17, 1942. H. D. ELSE 2,276,946
CENTRIFUGAL WASHING CHUCK
Filed Nov. 29, 1939
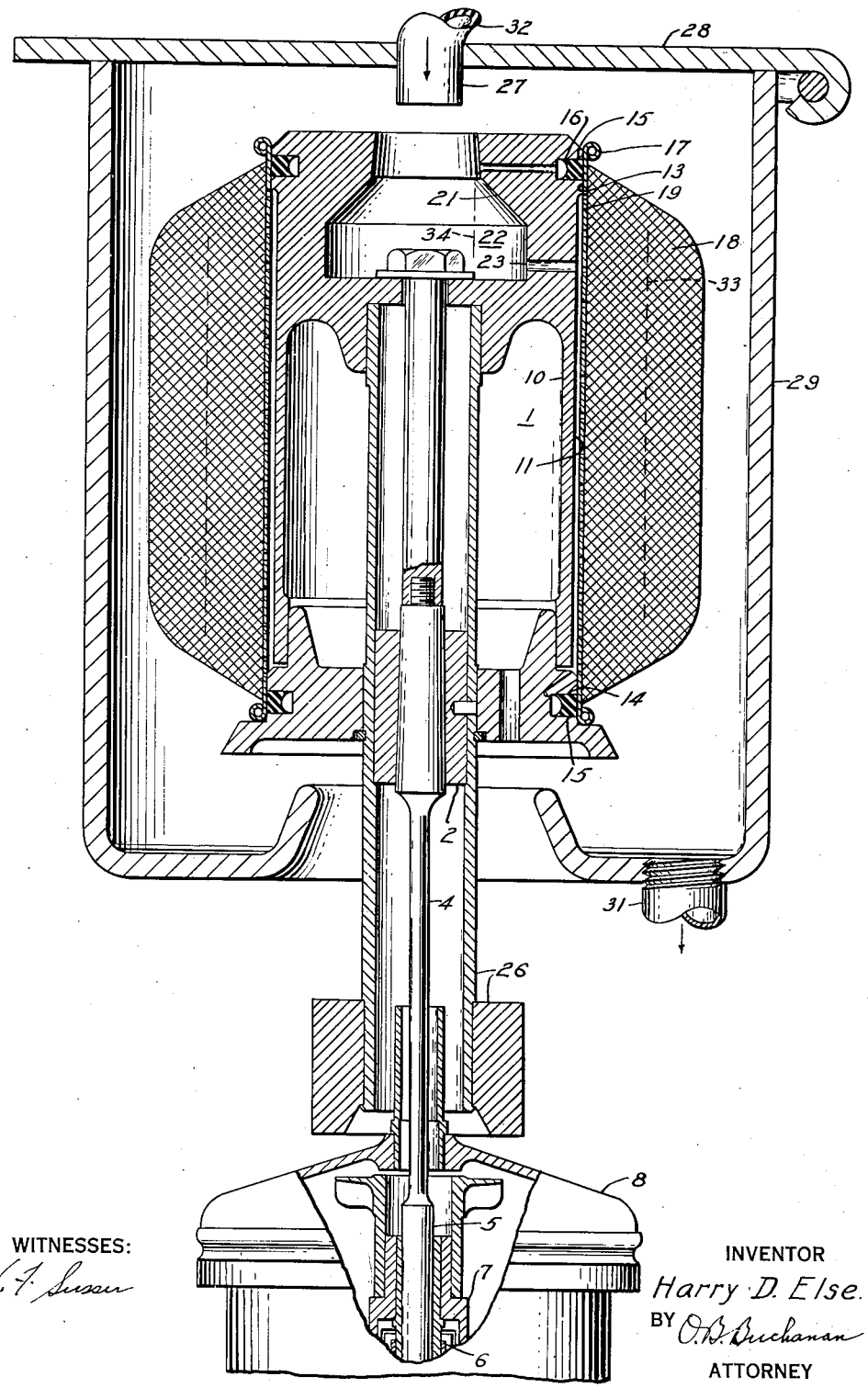
WITNESSES:
N. F. Susser
INVENTOR
Harry D. Else.
BY O. B. Buchanan
ATTORNEY Patented Mar. 17, 1942

2,276,946

UNITED STATES PATENT OFFICE 2,276,946

CENTRIFUGAL WASHING CHUCK

Harry D. Else, Lima, Ohio, assignor to Westinghouse Electric & Manufacturing Company, East Pittsburgh, Pa., a corporation of Pennsylvania Application November 29, 1939, Serial No. 306,765

4 Claims. (Cl. 68—205)

My invention relates to high-speed washing-chucks or centrifugal liquid-treating mechanisms of a type in which liquid is forced centrifugally in a substantially radial direction through a wound package of material to be treated, said material being wound on a perforated tubular bobbin surrounding the chuck.

The principal object of my invention is to provide an improved design of chuck whereby the amount of water existing in the chuck, at any moment, is limited, and whereby there can be no appreciable unequal distribution of this water, or accumulation thereof in one portion or segment of the chuck without distributing itself substantially uniformly around the entire circumference of the chuck.

Heretofore, considerable difficulty has been experienced as a result of unequal distribution of water in the chucks which have been previously in use, resulting in breakage of the vertical spindles or high-speed shafts which support the chuck, and resulting also in a considerable increase in the power required to accelerate the chuck to its high running-speed, particularly when that running-speed is higher than one or more critical speeds of vibration of the entire assembly.

It is an object of my invention to provide an assembly wherein the above-mentioned difficulties will be substantially avoided.

With the foregoing and other objects in view, my invention consists in the elements, combinations, assemblies, methods and structures hereinafter described and claimed, and illustrated in the accompanying drawing, wherein the single figure is a vertical cross-sectional view of a centrifugal washing, or liquid-treating, assembly in accordance with a preferred form of embodiment and application of my invention.

I have illustrated my invention in connection with a chuck 1 comprising a hub 2 which is mounted on the upper end 3 of a (usually flexible) vertical high-speed spindle or shaft 4, which is supported from only its lower end 5. This lower end of the spindle is journalled in a bearing 6, and is driven, at a high speed, by the rotor member 7 of an electric motor 8.

The chuck 1, in accordance with my invention, is provided with a hollow cylindrical member 10, which is joined to the hub 2, and which has a substantially smooth cylindrical outer surface 11 extending practically the entire height (or axial length) of the chuck, and bounded, at its ends, by two radially thin, annular sleeves or shoulders 13 and 14. The most important feature of each of the annular sleeves or shoulders 13 and 14, besides their small radial thickness, is a rubber sealing-ring 15 which is confined within a groove 16, said rubber sealing-ring 15 being adapted to make a tight joint to the inside of a perforated tubular bobbin 17, on which is wound a cake or package 18 of yarn which is to be washed. The annular bobbin-supporting collars or shoulders which are formed by the sealing-rings 15 at the respective ends of the chuck are shallow radially, with respect to the radius of the smooth outer cylindrical surface 11 of the chuck, so that only a short radial distance 19 exists in the annular space between the outer cylindrical surface 11 of the chuck and the inner bore of the tubular bobbin 17, this short radial distance 19 being of the order of $\frac{3}{32}$ of an inch, or less.

The top end of the chuck 1, in accordance with my invention, is hollow, to provide a central entrance-opening which has a conical inner surface 21, the larger end of the conical inner surface being at the bottom of said conical inner surface, and the top end of the conical inner surface being open. The larger, bottom end of the conical inner surface 21 provides or communicates with a smooth annular chamber 22 which is free of radially extending obstructions, so that water will be constrained, by centrifugal force, to accumulate therein, under the influence of centrifugal force, and wherein the water is free to flow circumferentially around the radially outward portion of said annular chamber 22, so as to distribute itself uniformly all the way around the chamber 22, under the influence of centrifugal force. In this way, I prevent piling up of the water at any one point or segment of the circumference. One or more holes or openings 23 are provided for communicating between the annular chamber 22 and the cylindrical outer surface 11 of the chuck, so as to deliver water to the radially restricted, annular space between said outer cylindrical surface 11 and the inner surface of the bobbin 17.

As is well known in the construction of high-speed devices which are mounted at the unsupported end of a shaft which is journaled at only one end, the chuck 1 is shown as being provided with a downwardly depending adapter 26, which serves to increase the horizontal moment of inertia without materially increasing the vertical moment of inertia.

Water is fed into the central entrance-opening in the top end of the chuck 1 through a nozzle 27 which extends through the center of a hinged cover 28 of a housing-member 29 which is provided, at its lower end, with a drain-opening 31, water being supplied to the nozzle 27 through a flexible hose 32.

In operation, the package 18 of yarn, as it comes from a spinning machine (not shown), being wound upon the perforated mandrel 17, is slipped down over the top end of the chuck 1, the motor 8 being deenergized at the moment, so that the chuck is not rotating. When the yarn-package 18 is in place, the housing-cover 28 is closed and the motor 8 is energized, and as the motor comes up to speed, water is supplied through the hose 32 and the nozzle 27. The water falls down into the central entrance-opening or cavity provided by the conical inner surface 21, the tapering walls of which cause the water to be forced downwardly, rather than upwardly, by centrifugal action, so as to cause the water to be accumulated within the annular chamber 22, where the water tends to accumulate, in an annular ring, being held out by centrifugal force. From the annular chamber 22, the water escapes, through the communicating holes or openings 23, to the radially restricted, annular space between the outer cylindrical surface 11 and the inside of the bobbin 17. These communicating openings 23 may be directed as the openings between the vanes of a centrifugal pump, to increase the pressure at the outer or exit-ends of said openings. The water is then driven out, centrifugally, through the perforations in the bobbin 17, so that the water passes radially outwardly through the yarn-package 18, washing the same, this washing operation being maintained for a suitable length of time, such as 30 minutes, more or less.

When the yarn 18 is thoroughly wet, with the water passing through it, a lively water-flow is maintained by a combined pressure-flow and suction, through the yarn-package 18. The dividing line between the positive and negative water-pressure heads is a cylindrical surface such as has been indicated in the drawing by the dotted line 33, somewhere near the middle of the package 18. If water is fed into the chuck at the maximum rate, it will pile up until it overflows at the top of the conical inner surface 21, as indicated by the cylindrical surface 34. The pressure-head between these two cylindrical surfaces 34 and 33 is the region in which the centrifugal action of the water creates a force greater than the atmospheric pressure, tending to move the water radially outwardly. At points beyond the dividing-line or cylinder 33, centrifugal force tends to suck the water out of the yarn-package 18, creating what is known as a negative head, that is, when the yarn is tightly wound and thoroughly saturated with water.

When the washing-operation first starts, this negative head does not exist, and the water-flow starts only slowly, and with difficulty, requiring a certain length of time, which may be of the order of one minute, for getting the water to flow relatively freely, or at its normal rate, through the yarn-package 18. It was during this critical initial time, as well as during the critical accelerating period of the motor 8, that difficulties were encountered, with previous constructions of washing-chucks, in water beginning to flow through the yarn in some spots more freely than others, and causing water to pile up unevenly, between radially extending arms or vanes which were provided in these previous washing-chucks.

In my improved chuck, it will be noted that only a small quantity of water can exist within the chuck, at any moment, namely, the water lying in the radially thin, annular space between the outer cylindrical surface 11 and the bobbin 17, and the small amounts of water filling the openings 23 and the annular chamber 22, down (at the most) to the cylindrical surface 34 which communicates with the upper end of the conical inner surface 21. If water is fed too fast, during the starting operation, as it frequently is, because of the difficulty of properly controlling the water-flow under these circumstances, the surplus water simply overflows over the top of the chuck. The annular chamber 22, as well as the outer annular chamber between the outer surface 11 and the bobbin 17, are both unrestricted in a circumferential direction, that is, they have no radially extending vanes or protuberances, so that any water lying in these chambers will distribute itself uniformly around the entire circumference, under the influence of centrifugal force.

It will thus be noted that I have avoided unsymmetrical accumulations of water, in my improved washing-chuck, and that I thus avoid the difficulties which were previously encountered because of such accumulations, such difficulties involving breakage of the narrow resilient spindles 4, as a result of the bending or whipping stresses produced by the unsymmetrical weight-distribution, and also involving starting-difficulties resulting from the increased horsepower necessary to drive the unbalanced-weight mechanism through its critical speed in cases where such a critical speed occurred below the running speed of the device, as frequently happens. These difficulties, in the past, have led some manufacturers to the adoption of stiffer and stiffer shafts 4, which in themselves were objectionable because of undesirable changes thereby produced in the critical speeds of operation of the entire organization. And in spite of all that could be done, heretofore, a very considerable shaft-breakage, with its attendant delays and replacement-expenses, had to be tolerated. Such difficulties have also led, in the past, to the adoption of motors having a larger horsepower-rating than would otherwise have been required if the unequal weight-distributions of the water in the chuck had not been encountered.

While I have illustrated my invention in a preferred form of embodiment, I wish it to be understood that I am not limited to any particular form, as various changes may be made by those skilled in the art, without departing from the essential spirit of my invention. I desire, therefore, that the appended claims shall be accorded the broadest construction consistent with their language.

I claim as my invention:

1. A high-speed washing-chuck comprising a hub adapted to be mounted on the upper end of a vertical high-speed shaft, a hollow cylindrical member joined to the hub and having a substantially smooth cylindrical outer surface, a radially thin, annular bobbin-supporting means at each end of said smooth cylindrical outer surface for making a tight, removable joint to the inside of a perforated tubular bobbin adapted to carry a wound package of material to be washed, whereby there will be only a slight radial spacing between said cylindrical outer surface of the chuck and the inner surface of said perforated tubular bobbin, said hollow cylindrical member having a central entrance-opening at its top end, said central entrance-opening having its top end open to receive a washing-liquid, and also having a flared portion whereby its open top end is of a smaller diameter than its lower end and whereby the washing-liquid is constrained, by centrifugal force, to follow the flaring wall of the flared portion and to occupy the outer annular portion of the said lower, enlarged end of said entrance-opening, and a smooth annular chamber communicating with the lower, large end of said central entrance-opening, said annular chamber being substantially unrestricted in a circumferential direction so that the washing-liquid is free to flow circumferentially around the radially outward portion of said annular chamber, and one or more openings communicating between said annular chamber and said cylindrical outer surface.

2. A high-speed, centrifugal, liquid-treating mechanism for forcing a liquid centrifugally through a wound package of material to be treated, said material being wound on a perforated tubular bobbin, said liquid-treating mechanism comprising a chuck for interiorly engaging said bobbin, means for pouring a treating-liquid into the top of said chuck, a vertical shaft having its top end interiorly engaging said chuck, means for supporting only the lower end-portion of said shaft for rotating movement, and driving-means operative on the lower portion of said shaft, characterized by said chuck comprising a hub mounted on said shaft, a hollow cylindrical member joined to the hub and having a substantially smooth cylindrical outer surface, a radially thin, annular bobbin-supporting means at each end of said smooth cylindrical outer surface for making a tight, removable joint to the inside of said perforated tubular bobbin, whereby there will be only a slight radial spacing between said cylindrical outer surface of the chuck and the inner surface of said perforated tubular bobbin, said hollow cylindrical member having a central entrance-opening at its top end, said central entrance-opening having its top end open to receive said treating-liquid, and also having a flared portion whereby its open top end is of a smaller diameter than its lower end and whereby the treating-liquid is constrained, by centrifugal force, to follow the flaring wall of the flared portion and to occupy the outer annular portion of the said lower, enlarged end of said entrance-opening, and a smooth annular chamber communicating with the lower, large end of said central entrance-opening, said annular chamber being substantially unrestricted in a circumferential direction so that the treating-liquid is free to flow circumferentially around the radially outward portion of said annular chamber, and one or more openings communicating between said annular chamber and said cylindrical outer surface.

3. A high-speed washing-chuck comprising a hub adapted to be mounted on the upper end of a vertical high-speed shaft, a hollow cylindrical member joined to the hub and having a substantially smooth cylindrical outer surface, a radially thin, annular bobbin-supporting means at each end of said smooth cylindrical outer surface for making a tight, removable joint to the inside of a perforated tubular bobbin adapted to carry a wound package of material to be washed, whereby there will be only a slight radial spacing between said cylindrical outer surface of the chuck and the inner surface of said perforated tubular bobbin, said hollow cylindrical member having a conical inner surface at its top end, the larger end of said conical inner surface being at the bottom of said conical inner surface, the top end of said conical inner surface being open, and a smooth annular chamber communicating with the lower, large end of said conical inner surface, whereby a washing-liquid is constrained, by centrifugal force, to follow said conical inner surface and to occupy said smooth annular chamber, said annular chamber being substantially unrestricted in a circumferential direction so that the washing-liquid is free to flow circumferentially around the radially outward portion of said annular chamber, and one or more openings communicating between said annular chamber and said cylindrical outer surface.

4. A high-speed, centrifugal, liquid-treating mechanism for forcing a liquid centrifugally through a wound package of material to be treated, said material being wound on a perforated tubular bobbin, said liquid-treating mechanism comprising a chuck for interiorly engaging said bobbin, means for pouring a treating-liquid into the top of said chuck, a vertical shaft having its top end interiorly engaging said chuck, means for supporting only the lower end-portion of said shaft for rotating movement, and driving-means operative on the lower portion of said shaft for driving it at a normal running speed which is higher than at least one critical speed of the aggregate, characterized by said chuck comprising a hub mounted on said shaft, a hollow cylindrical member joined to the hub and having a substantially smooth cylindrical outer surface, a radially thin, annular bobbin-supporting means at each end of said smooth cylindrical outer surface for making a tight, removable joint to the inside of said perforated tubular bobbin, whereby there will be only a slight radial spacing between said cylindrical outer surface of the chuck and the inner surface of said perforated tubular bobbin, said hollow cylindrical member having a central entrance-opening at its top end, said central entrance-opening having its top end open to receive said treating-liquid, and also having a flared portion whereby its open top end is of a smaller diameter than its lower end and whereby the treating-liquid is constrained, by centrifugal force, to follow the flaring wall of the flared portion and to occupy the outer annular portion of the said lower, enlarged end of said entrance-opening, and a smooth annular chamber communicating with the lower, large end of said central entrance-opening, said annular chamber being substantially unrestricted in a circumferential direction so that the treating-liquid is free to flow circumferentially around the radially outward portion of said annular chamber, and one or more openings communicating between said annular chamber and said cylindrical outer surface.

HARRY D. ELSE.